United States Patent [19]
Arcas et al.

[11] Patent Number: 5,175,401
[45] Date of Patent: Dec. 29, 1992

[54] SEGMENTED RESISTANCE ACOUSTIC ATTENUATING LINER

[75] Inventors: Noe Arcas, Plainview; Charles A. Parente, Oyster Bay, both of N.Y.

[73] Assignee: Grumman Aerospace Corporation, Bethpage, N.Y.

[21] Appl. No.: 670,917

[22] Filed: Mar. 18, 1991

[51] Int. Cl.⁵ .............................................. E04B 1/82
[52] U.S. Cl. ................................... 181/292; 181/286
[58] Field of Search ......................... 181/292, 290, 286

[56] References Cited

U.S. PATENT DOCUMENTS

| | | | |
|---|---|---|---|
| 3,630,312 | 12/1971 | Woodward et al. | 181/292 |
| 4,111,081 | 9/1978 | Hilliard et al. | 181/290 |
| 4,410,065 | 10/1983 | Harvey | 181/292 |
| 4,433,021 | 2/1984 | Riel | 181/292 |
| 4,465,725 | 8/1984 | Riel | 181/292 |
| 4,947,958 | 8/1990 | Snyder | 181/293 |
| 4,990,391 | 2/1991 | Veta | 181/292 |

Primary Examiner—Michael L. Gellner
Assistant Examiner—Eddie C. Lee
Attorney, Agent, or Firm—Richard G. Geib; Daniel J. Tick; Carl J. Evens

[57] ABSTRACT

An acoustic attenuating liner has a non-metallic honeycomb core bonded on a backsheet. A corrosion-insulated perforated sheet is bonded to the honeycomb core by adhesive between the perforated sheet and the core. The mesh is woven to a plurality of different determined weave patterns from material on and affixed to the perforated sheet, whereby the mesh has a plurality of different resistances. The mesh is aligned with the perforated sheet and is bonded to the perforated sheet by additional adhesive between the mesh and the perforated sheet, thereby providing a segmented liner with a plurality of facesheet resistances.

20 Claims, 2 Drawing Sheets

SEGMENTED RESISTANCE ACOUSTIC ATTENUATING LINER

BACKGROUND OF THE INVENTION

The present invention relates to an acoustic attenuating liner. More particularly, the invention relates to a segmented resistance acoustic attenuating liner.

Typical jet engine acoustic liners are designed with a uniform acoustic impedance to attenuate a specific acoustic mode of the engine noise signature. Segmented liners have been used to attenuate several modes and noise levels at several frequencies by having separate resistance and core depth values over the liner area. While offering significant advantages, these liners are more complex to manufacture and have reduced acoustically treated areas due to interfacing at the segment boundaries. The reduced acoustic areas result from splicing the facesheet wire mesh, splicing the honeycomb core and requirements for added parts to mechanically fasten the segments.

The principal object of the invention is to provide an acoustic attenuating liner of simple structure which functions efficiently, effectively and reliably to reduce the noise of a jet engine.

An object of the invention is to provide an acoustic attenuating liner which is lightweight, durable and corrosion-resistant.

Another object of the invention is to provide an acoustic attenuating liner suitable for use with high bypass aircraft jet engines.

Still another object of the invention is to provide an acoustic attenuating liner having a single perforated sheet used for all segments of different resistance.

Yet another object of the invention is to provide an acoustic attenuating liner having a single perforated sheet used for all segments of different resistance, the resistance of which is dependent on a wire mesh thereof only.

Another object of the invention is to provide an acoustic attenuating liner having no splices between segments of different resistance and providing improved engine noise attenuation.

Still another object of the invention is to provide an acoustic attenuating liner which is inexpensive in manufacture due to a reduced number of component parts, reduced parts handling and reduced weight.

Yet another object of the invention is to provide an acoustic attenuating liner of simple structure which is inexpensive in manufacture and functions efficiently, effectively and reliably to attenuate the noise of a jet engine.

BRIEF SUMMARY OF THE INVENTION

In accordance with the invention, a segmented resistance acoustic liner comprises a backsheet, a honeycomb core on the backsheet and bonded thereto, a perforated sheet on the honeycomb core bonded to the core and a mesh woven to a plurality of different determined weave patterns from material on and affixed to the perforated sheet, whereby the mesh has a plurality of different resistances, the perforated sheet being reticulated and the mesh being aligned with the perforated sheet and bonded to the perforated sheet, thereby providing a segmented liner with a plurality of facesheet resistances.

The mesh comprises wire having a plurality of different numbers of wires per unit length, thereby producing the different resistances.

The backsheet comprises aluminum, or non-metallic material.

The perforated sheet comprises anodized aluminum and has a per cent open area ranging from 27 to 35% of its surface and a maximum thickness of 0.025 inch for low mass reactance.

The mesh comprises stainless steel wire.

The honeycomb core comprises aluminum, or non-metallic material.

The perforated sheet comprises a graphite epoxy weave woven to a determined pattern which provides low non-linearity factors and a weave pattern which permits resistance changes for tuning the final resistance of the liner.

The perforated sheet comprises a graphite epoxy open weave woven to a determined open area with the weave cross-section flattened to provide a bonding surface and smooth aerodynamics.

In accordance with the invention, a segmented resistance accoustic attenuating liner comprises a backsheet, a honeycomb core on the backsheet and bonded thereto, a perforated sheet on the honeycomb core, adhesive between the perforated sheet and the core for bonding the perforated sheet to the core, a mesh woven to a plurality of different determined weave patterns from material on and affixed to the perforated sheet, whereby the mesh has a plurality of different resistances, the perforated sheet being reticulated and the mesh being aligned with the perforated sheet, and additional adhesive between the mesh and the perforated sheet for bonding the mesh to the perforated sheet, thereby providing a segmented liner with a plurality of facesheet resistances.

The mesh comprises wire having a plurality of different numbers of wires per unit length, thereby producing the different resistances.

The backsheet comprises aluminum.

The perforated sheet comprises anodized aluminum and has a per cent open area ranging from 27 to 35% of its surface and a maximum thickness of 0.025 inch for low mass reactance.

The mesh comprises stainless steel wire.

The honeycomb core comprises aluminum, or non-metallic material.

The perforated sheet comprises a graphite epoxy weave woven to a determined pattern which provides low non-linearity factors and a weave pattern which permits resistance changes for tuning the final resistance of the liner.

The perforated sheet comprises a graphite epoxy open weave woven to a determined open area with the weave cross-section flattened to provide a bonding surface and smooth aerodynamics.

In accordance with the invention, a segmented resistance acoustic attenuating liner comprises a backsheet, a corrosion-resistant honeycomb core on the backsheet and bonded thereto, a corrosion-insulated perforated sheet on the honeycomb core, adhesive between the perforated sheet and the core for bonding the perforated sheet to the core, a mesh woven to a plurality of different determined weave patterns from corrosion-resistant metal on the perforated sheet, whereby the mesh has a plurality of different resistances, the perforated sheet being reticulated and the mesh being aligned with the perforated sheet, the mesh comprising stainless steel wire having a plurality of different numbers of wires per unit length, thereby producing such different resistances and additional adhesive between the mesh and the perforated sheet for bonding the mesh to the perforated sheet, the additional adhesive having predetermined characteristics including a minimum viscosity of 1000 poises during curing and a predetermined thickness, thereby providing a segmented liner with a plurality of facesheet resistances.

The backsheet comprises aluminum, the perforated sheet comprises anodized aluminum and has a per cent open area ranging from 27 to 35% of its surface and a maximum thickness of 0.025 inch for low mass reactance, said honeycomb core comprises non-metallic material and wherein the perforated sheet comprises a graphite epoxy weave woven to a determined pattern which provides low non-linearity factors and a weave pattern which permits resistance changes for tuning the final resistance of the liner.

BRIEF DESCRIPTION OF THE DRAWINGS

In order that the invention may be readily carried into effect, it will now be described with reference to the accompanying drawings, wherein.

DETAILED DESCRIPTION OF PREFERRED EMBODIMENTS

Figure 1:
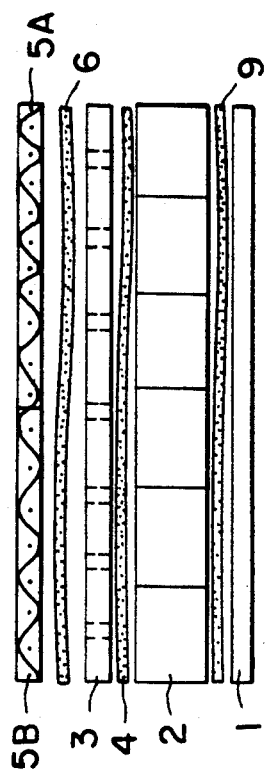
FIG. 1 is a schematic diagram, with the components separated from each other, of an embodiment of a segmented resistance acoustic attenuating liner.

FIG. 1 shows a segmented resistance acoustic attenuating liner comprising a backsheet 1 of any suitable known type having a honeycomb core 2 of any suitable known type placed on said backsheet and bonded thereto. A perforated sheet 3 of any suitable known type is provided on the honeycomb core 2 and is bonded to said core in any suitable manner with the assistance of adhesive 4.

If it is desired that the acoustic attenuating liner have a segmented resistance, at least two pieces of any suitable known type of wire mesh 5A and 5B are provided having resistances which are different from each other. The pieces of wire mesh 5A and 5B are bonded to the perforated sheet 3 in any suitable manner with the assistance of adhesive 6.

The pieces 5A and 5B of facesheet wire mesh are spliced by a splice 7 of any suitable known type, such as, for example, fiberglass, which splice is affixed to both said pieces by adhesive 8. The use of the splice 7 results in lost wire mesh areas and may result in two different types of wire mesh, peeling and/or delamination.

Figure 2:
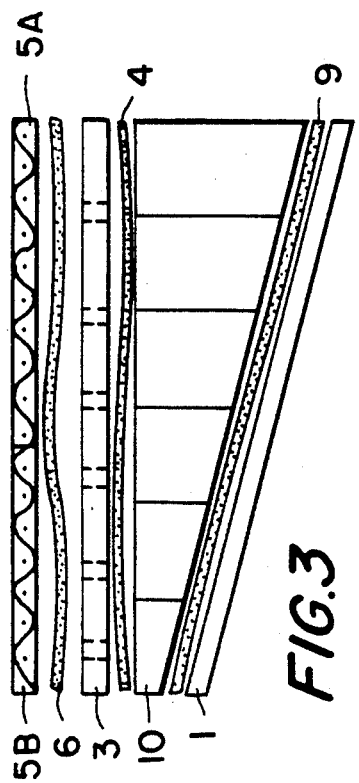
FIG. 2 is a schematic diagram, with the components separated from each other, of a first embodiment of the segmented resistance acoustic attenuating liner of the invention.

The first embodiment of the segmented resistance acoustic attenuating liner of the invention, as shown in FIG. 2, comprises a backsheet 1 of solid aluminum. A corrosion-resistant aluminum honeycomb core 2 of any suitable known type such as, for example, the PAA (Reg. Trademark) core of American Cyanamid, is placed on the backsheet 1 and bonded thereto. The core 2 is further protected against corrosion by dip priming in corrosion-inhibiting adhesive primer, such as, for example, Hysol EA9205 primer, which consists of a trifunctional aromatic glycidyl ether and epoxidized novolac epoxy resin cured with a 4,4'-diaminodiphenylsulfone/dicyandiamide filled with strontium chromate, all dissolved or suspended in methyl ethyl ketone solvent to provide a sprayable solution. A corrosion-insulated perforated sheet 3 of any suitable known type is provided on the honeycomb core 2. The perforated sheet 3 is preferably corrosion-insulated by anodizing the aluminum sheet in sulfuric acid, followed by the use of a corrosion-inhibiting adhesive primer, such as, for example, Hysol EA9205 primer.

The perforated sheet 3 preferably has a per cent open area ranging from 27 to 35% of its surface. The selected opening percentage is preferably uniform over the entire surface area of the perforated sheet 3.

Adhesive 4 of a type capable of reticulation is placed between the perforated sheet 3 and the honeycomb core 2 for bonding said perforated sheet to said core. This adhesive is reticulated on the perforated skin to eliminate adhesive blockage of the perforated holes. The only blockage that results is at the intersection of the perforate and the core. Standard reticulation methods result in reticulation of the honeycomb core and the inherent blockage of many holes which will result in decreased acoustic performance of the liner. This "reverse reticulation" is accomplished by using a reticulation system designed to move the perforated skin across an air knife at a predetermined rate and air temperature and flow rate. The air knife is designed to fit the contour of the part such that the reticulation adhesive forms uniformly around the holes. The reticulation is performed on the perforated sheet 3 in order to prevent blockage of the holes.

Another key to improving the acoustic performance is reducing the thickness of the perforated sheet and maintaining the hole size and spacing. A thin skin with a large open area of 27 to 35%, along with the proper wire mesh will result in a liner which has a low mass reactance factor, low non-linearity factor and small variation in resistance with grazing flow. A wire mesh 5A, 5B woven from corrosion-resistant metal is placed on the perforated sheet 3. The wire mesh 5A, 5B preferably comprises a stainless steel which has been woven from an alloy which has not been drawn in fine wires prior to this. Low non-linearity factors result in liners that are insensitive to sound pressure level magnitude. Grazing flow over the liner surface modifies the liner's orifice discharge coefficient and alters resistance with changes in grazing flow velocity. Low mass reactance factors of liners has been demonstrated to improve the acoustic properties. The wire mesh 5A, 5B may comprise any suitable known corrosion-resistant wire, such as, for example, an alloy woven in a reverse plain Dutch weave pattern to meet specific flow resistance values.

In accordance with the invention, the acoustic impedance of the linear liner is dependent on the liner facesheet resistance and cavity depth. The facesheet is composed of the woven wire mesh material 5A, 5B bonded to the perforated sheet 3. Changing the resistance of the wire mesh 5A, 5B changes the facesheet resistance, which determines the resistive component of the liner impedance. Although a sheet of woven wire mesh is currently configured for a single resistance by preselecting the weave pattern, wire diameter and the number of wires per unit length, current technology exists to produce sheets of wire mesh with specified resistance values over a plurality of segments of the sheet. By properly aligning the segmented mesh sheet 5A, 5B with the perforated material 3, a segmented liner with a plurality of facesheet resistances can be constructed with no splices at the segment boundaries.

The drawing of thin strands of wire from a corrosion-resistant alloy of any suitable known type and weaving this wire into particular weaves for the facesheet has a two-fold purpose. The first is for corrosion resistance and the second is for improved acoustic and varied performance in accordance with the invention. The mesh 5A, 5B is configured with a constant number of strands in the warp and in the fill direction over a segment of its area. A fixed number of strands are removed from the fill direction to vary the resistance over a second separate area segment. The acoustic properties are thus varied in accordance with variations of the resistance of the wire mesh 5A, 5B over different areas of said mesh. The wire mesh 5A, 5B has approximately 720 to 725 strands in the warp direction at one end in the piece 5A thereof, and approximately 720 to 725 strands in the warp direction at the other end in the piece 5B thereof, with different variations in between and approximately 115 to 120 strands in the fill direction at the one end in the piece 5A and approximately 135 to 150 strands in the fill direction at the other end in the piece 5B, with different variations in between. The acoustic properties are thus varied in accordance with variations of the resistance of the wire mesh 5A, 5B in different areas of said wire mesh. The core 2 is bonded to the backsheet 1 with adhesive 9 of any suitable known type.

The additional adhesive 6 is placed between the wire mesh 5A, 5B and the perforated sheet 3 to bond said mesh to said perforated sheet. The additional adhesive 6 is selected especially, because it has predetermined characteristics, including a minimum viscosity of 1000 poises during subsequent curing. More particularly, the additional adhesive is preferably a precatalyzed epoxy adhesive in solution form; suitable for application by spray technique, such as, for example, that manufactured by the Minnesota Mining and Manufacturing Company and known as EC3710. The adhesive spray thickness must fall within a designed thickness in order to meet the acoustic requirements, not become blocked, and also have sufficient peel strength to prevent peeling or delamination in service. The adhesive spray is preferably applied by robot to a set pattern which will apply a uniform coating in addition to an adhesive of predetermined thickness. When it is used to join metals, the adhesive 6 is substantially 0.6 to 0.9 mil in thickness and when it is used to join graphite composites, the adhesive 6 is substantially 1.0 to 1.5 mils in thickness. The additional adhesive 6 is sprayed on by a robot, so that a calculated amount of adhesive thickness is applied to the perforated surface which will provide the correct amount of peel strength and will prevent blockage of the woven wire mesh.

Figure 3:
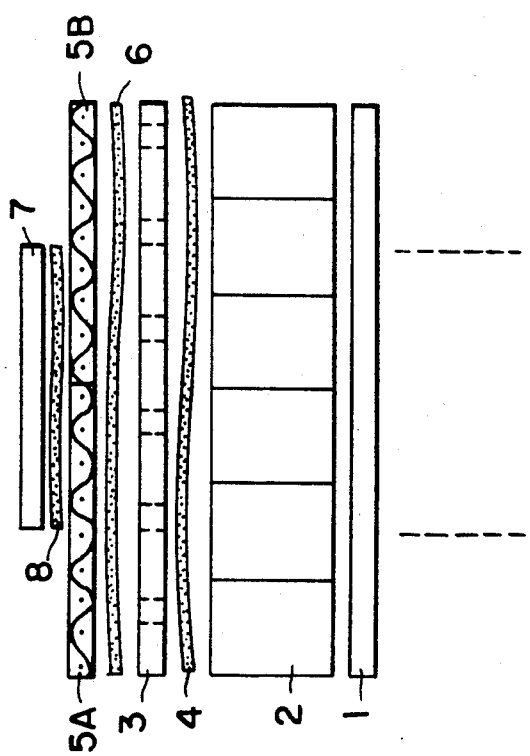
FIG. 3 is a schematic diagram, with the components separated from each other, of a modification of the first embodiment of the segmented resistance acoustic attenuating liner of the invention.

In the first modification of the first embodiment of the invention, shown in FIG. 3, the components are the same as in said first embodiment, with the exception of the honeycomb core 10, which is tapered, as shown in FIG. 3.

Figure 4:
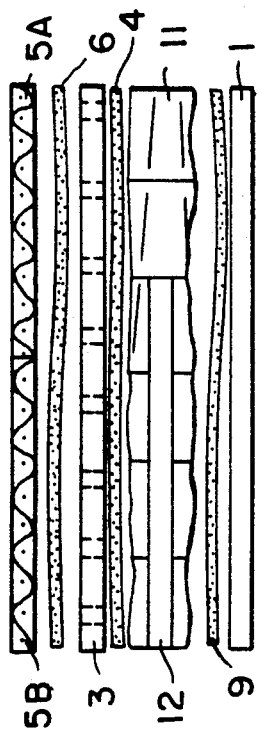
FIG. 4 is a schematic diagram, with the components separated from each other, of another modification of the first embodiment of the segmented resistance acoustic attenuating liner of the invention.

In the second modification of the first embodiment of the invention, shown in FIG. 4, the components are the same as in said first embodiment, with the exception of the honeycomb core 11, which has a solid septum skin 12 thereon, as shown in FIG. 4.

Figure 5:
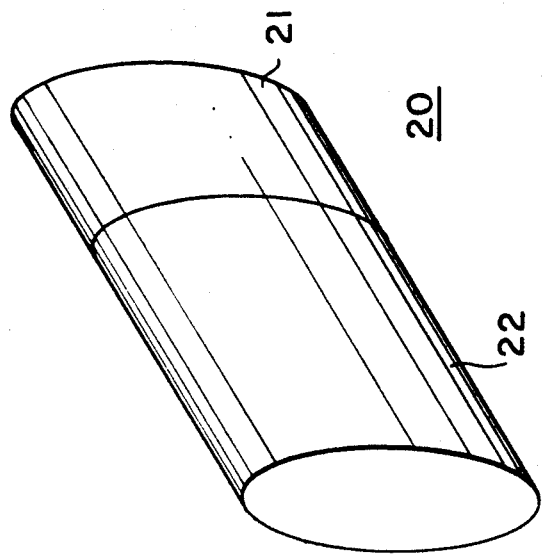
FIG. 5 is a schematic diagram, with the components separated from each other, of a second embodiment of the segmented resistance acoustic attenuating liner of the invention.

The second embodiment of the segmented resistance acoustic attenuating liner of the invention, shown in FIG. 5, comprises a backsheet 1 of a non-metallic solid composite material of any suitable type, preferably reinforced graphite. A first honeycomb core 13 of non-metallic material, such as, for example, composite material, such as, for example, Nomex TM, is bonded to the backsheet 1 with adhesive 14 of any suitable known type. The key to this part of the structure is the reticulating adhesive. The normal acoustic liners have the reticulating adhesive applied to the honeycomb core, which results in blockage of many holes on the perforated skin during the bonding. This blockage results in reduced acoustic performance. Instead, a method has been devised whereby the reticulating adhesive is applied on the perforated skin. This is accomplished by utilizing a reticulating system which controls the temperature, airflow rate and sweep time of the perforate over the air knife. The resulting skin has no blocked holes, so that when it is combined with the other components results in an improved liner.

In the second embodiment of the invention, as shown in FIG. 5, a first segmented wire mesh 5A, 5B is bonded to the first honeycomb core 13 by adhesive 15 of any suitable known type. A second honeycomb core 16 of non-metallic material, such as, for example, composite material, such as, for example, Nomex TM, is bonded to the first segmented wire mesh 5A, 5B by adhesive 17 of any suitable known type. A perforated sheet 18 of graphite yarn woven in an open weave and impregnated with epoxy is bonded to the honeycomb core 16 with the adhesive 4 of reticulating type and applied to the open surface by a reticulation process. The open weave material is woven to provide an open area of consistent percentage. This material is woven such that the tows of the graphite weave leave a low profile. This is accomplished by dividing the number of graphite strands into smaller bundles during the weaving process. A low profile perforated skin results which accomplishes two important tasks. The first is that the low profile provides a wider footprint for bonding the wire mesh and provides greater peel strength. The second is that the low profile of the cured perforate is an improved aerodynamic surface which is required for both engine and acoustic performance. The open weaves per cent open area may be increased or decreased during the weaving thereof to account for changes in acoustic attenuation requirements. A second segmented stainless steel wire mesh 19A, 19B is bonded to the perforated sheet 18 by the additional adhesive 6 of the embodiment of FIG. 2 in the embodiment of FIG. 5. The additional adhesive 6 is controlled to provide good peel strength and low blockage for good acoustic performance.

The segmented resistance acoustic attenuating liner of the invention may be made for a high bypass jet engine inlet or bypass cowling. In the method of making an acoustic attenuating liner of the invention for an engine cowling, graphite is woven to form a perforated sheet. The graphite is then prepregged with epoxy resin and cured into a desired configuration, preferably of a portion of an engine cowling. Adhesive is reticulated onto the surface of an open weave, such that the open area remains the same, and a honeycomb core of non-metallic material is placed on the surface of the open weave having the adhesive. A solid graphite backsheet is placed on the opposite side of the honeycomb core from the open weave. The assembly of the backsheet, the honeycomb core and the perforated sheet is cured in a one-shot autoclave operation.

The open weave is sprayed with an additional adhesive, which is the same as the additional adhesive of the first and second embodiments of the invention, on its opposite surface. In the first and second embodiments of the invention, the assembly is staged in an oven at substantially 210° F. for substantially one hour.

A stainless steel mesh, which is the same as the mesh of the first and second embodiments of the invention, is added to the additional adhesive on the opposite surface of the open weave. The additional adhesive is cured and the mesh is bonded to the previously bonded backsheet, honeycomb core and perforated sheet and all are bonded at a pressure of substantially 45 psi.

Figure 6:
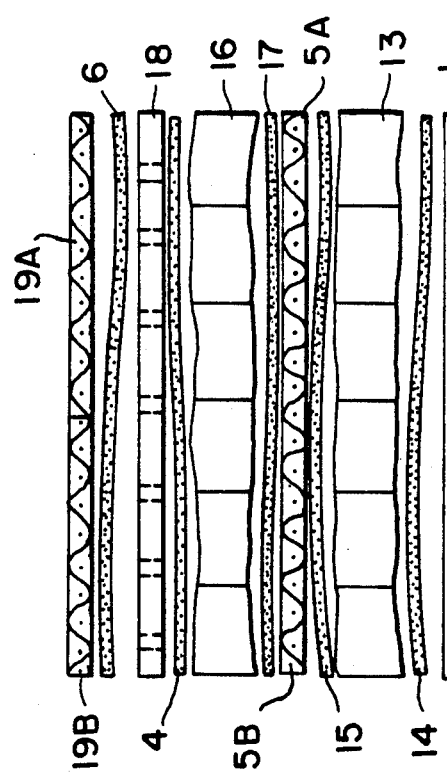
FIG. 6 is a perspective view of a cowling modification of the segmented resistance acoustic attenuating liner of the invention.

The cowling modification of the embodiment of the segmented resistance acoustic attenuating liner of the invention, shown in FIG. 6, comprises a high bypass engine liner barrel 20 composed of two resistance segments 21 and 22. In the configuration of FIG. 6, the segments 21 and 22 are equivalent core depth liners. The key to this configuration is that the wire mesh is constructed in a manner whereby its resistance over the area of the segment 21 is constant, but of different value from the constant resistance of the segment 22. However, the segments 21 and 22 consist of the same continuous perforated sheet, honeycomb core and backsheet, with no splice line between said segments.

Although shown and described in what are believed to be the most practical and preferred embodiments, it is apparent that departures from the specific method and design described and shown will suggest themselves to those skilled in the art and may be made without departing from the spirit and scope of the invention. We, therefore, do not wish to restrict ourselves to the particular construction described and illustrated, but desire to avail ourselves of all modifications that may fall within the scope of the appended claims.

We claim:

1. A segmented resistance acoustic attenuating liner, comprising
    a back sheet;
    a honeycomb core on said backsheet and bonded thereto;
    a perforated sheet on said honeycomb core bonded to said core; and
    a mesh woven to a plurality of different determined weave patterns from material on and affixed to said perforated sheet, whereby said mesh comprises wire having a plurality of different numbers of wires per unit length, thereby providing a plurality of different resistances, said perforated sheet being reticulated and said mesh being aligned with said perforated sheet and bonded to said perforated sheet, thereby providing a segmented liner with a plurality of facesheet resistances.

2. A segmented resistance acoustic attenuating liner as claimed in claim 1, wherein said backsheet comprises aluminum.

3. A segmented resistance acoustic attenuating liner as claimed in claim 1, wherein said perforated sheet comprises anodized aluminum and has a per cent open area ranging from 27 to 35% of its surface and a maximum thickness of 0.025 inch for low mass reactance.

4. A segmented resistance acoustic attenuating liner as claimed in claim 1, wherein said mesh comprises stainless steel wire.

5. A segmented resistance acoustic attenuating liner as claimed in claim 1, wherein said honeycomb core comprises aluminum.

6. A segmented resistance acoustic attenuating liner as claimed in claim 1, wherein said honeycomb core comprises non-metallic material.

7. A segmented resistance acoustic attenuating liner as claimed in claim 1, wherein said backsheet comprises non-metallic material.

8. A segmented resistance acoustic attenuating liner as claimed in claim 1, wherein said perforated sheet comprises a graphite epoxy weave woven to a determined pattern which provides low non-linearity factors and a weave pattern which permits resistance changes for tuning the final resistance of said liner.

9. A segmented resistance acoustic attenuating liner as claimed in claim 8, wherein said perforated sheet comprises a graphite epoxy open weave woven to a determined open area with the weave cross-section flattened to provide a bonding surface and smooth aerodynamics.

10. A segmented resistance acoustic attenuating liner, comprising
    a backsheet;
    a honeycomb core on and affixed to said backsheet and bonded thereto;
    a perforated sheet on said honeycomb core;
    adhesive between said perforated sheet and said core for bonding said perforated sheet to said core;
    a mesh woven to a plurality of different determined weave patterns from material on and affixed to said perforated sheet, whereby said mesh comprises wire having a plurality of different numbers of wires per unit length, thereby providing a plurality of different resistances, said perforated sheet being reticulated and said mesh being aligned with said perforated sheet; and
    additional adhesive between said mesh and said perforated sheet for bonding said mesh to said perforated sheet, thereby providing a segmented liner with a plurality of facesheet resistances.

11. A segmented resistance acoustic attenuating liner as claimed in claim 10, wherein said backsheet comprises aluminum.

12. A segmented resistance acoustic attenuating liner as claimed in claim 10, wherein said perforated sheet comprises anodized aluminum and has a per cent open area ranging from 27 to 35% of its surface and a maximum thickness of 0.025 inch for low mass reactance.

13. A segmented resistance acoustic attenuating liner as claimed in claim 10, wherein said mesh comprises stainless steel wire.

14. A segmented resistance acoustic attenuating liner as claimed in claim 10, wherein said honeycomb core comprises aluminum.

15. A segmented resistance acoustic attenuating liner as claimed in claim 10, wherein said honeycomb core comprises non-metallic material.

16. A segmented resistance acoustic attenuating liner as claimed in claim 10, wherein said perforated sheet comprises a graphite epoxy weave woven to a determined pattern which provides low non-linearity factors and a weave pattern which permits resistance changes for tuning the final resistance of said liner.

17. A segmented resistance attenuating liner as claimed in claim 16, wherein said perforated sheet comprises a graphite epoxy open weave woven to a determined open area with the weave cross-section flattened to provide a bonding surface and smooth aerodynamics.

18. A segmented resistance acoustic attentuating liner, comprising
   a backsheet;
   a corrosion-resistant honeycomb core on said backsheet and bonded thereto;
   a corrosion-insulated perforated sheet on said honeycomb core;
   adhesive between said perforated sheet and said core for bonding perforated sheet to said core;
   a mesh woven to a plurality of different determined weave patterns from corrosion-resistant metal on said perforated sheet, whereby said mesh comprises stainless steel wire having a plurality of different numbers of wires per unit length, thereby producing a plurality of different resistances, said perforated sheet being reticulated and said mesh being aligned with said perforated sheet; and
   additional adhesive between said mesh and said perforated sheet for bonding said mesh to said perforated sheet, said additional adhesive having predetermined characteristics including a minimum viscosity of 1000 poises during curing and a predetermined thickness, thereby providing a segmented liner with a plurality of facesheet resistances.

19. A segmented resistance acoustic attenuating liner as claimed in claim 18, wherein said backsheet comprises aluminum, said perforated sheet comprises anodized aluminum and has a per cent open area ranging from 27 to 35% of its surface and a maximum thickness of 0.025 inch for low mass reactance, said honeycomb core comprises non-metallic material.

20. A segmented resistance acoustic attenuating liner as claimed in claim 18, wherein said perforated sheet comprises a graphite epoxy weave woven to a determined pattern which provides low non-linearity factors and a weave pattern which permits resistance changes for tuning the final resistance of said liner.

* * * * *